United States Patent [19]

Arenhold

[11] 4,323,262

[45] Apr. 6, 1982

[54] UNIVERSAL MUDGUARD FLAP AND CLAMP FOR MOTOR VEHICLES

[76] Inventor: Knut Arenhold, Westend 7, 2000 Hamburg 52, Fed. Rep. of Germany

[21] Appl. No.: 96,403

[22] Filed: Nov. 21, 1979

[30] Foreign Application Priority Data

Nov. 30, 1978 [DE] Fed. Rep. of Germany ....... 2851748
Feb. 15, 1979 [DE] Fed. Rep. of Germany ....... 2905753

[51] Int. Cl.$^3$ .............................................. B62D 25/16
[52] U.S. Cl. .............................. 280/154.5 R; 403/312
[58] Field of Search ............... 280/152 R, 153 R, 154, 280/154.5 R; 24/73 CE, 73 SP, 81 FT; 151/35, 37; 403/310, 312, 313

[56] References Cited

U.S. PATENT DOCUMENTS

| 1,396,351 | 11/1921 | Behn ..................................... 280/154 |
| 2,124,513 | 7/1938 | Bahr ............................. 280/154.5 R |
| 2,755,484 | 7/1956 | Hotz ......................... 280/154.5 R X |
| 2,828,841 | 4/1958 | Weeks .............................. 403/312 X |
| 2,921,766 | 1/1960 | Bauer ............................ 24/73 SP X |
| 3,049,161 | 8/1962 | Attwood ................................ 151/37 |
| 3,237,963 | 3/1966 | Menzer .......................... 280/154.5 R |
| 3,778,086 | 12/1973 | Moore et al. ................. 280/154.5 R |

4,174,850 11/1979 Hart ................................. 280/153 R

*Primary Examiner*—Joseph F. Peters, Jr.
*Assistant Examiner*—Michael Mar
*Attorney, Agent, or Firm*—Murray and Whisenhunt

[57] ABSTRACT

There is provided a combination of a universal mudguard for motor vehicles and at least one clamp for attaching the flap to the fender fold of the vehicle. The mudguard comprises a main body flap, an adapter protrusion at the top thereof to align the mudguard flap with the contours of the vehicle chassis, and an upper edge on the main body flap which joins with an inner edge of the adapter protrusion. The clamp has an open end, which is engageable with the said upper edge of the main body flap and an adjacent portion of the fender fold, and a closed end spaced from the open end. The improvement in the clamp is that of having generally two parallel clamping jaws held together by at least one bolt, the closed end having a crosspiece projecting from one of the jaws and abutting the other jaw, and at least one jaw at the open end having at least one bent over corner end area wherein the direction of the bend is toward the other jaw.

20 Claims, 13 Drawing Figures

UNIVERSAL MUDGUARD FLAP AND CLAMP FOR MOTOR VEHICLES

The invention relates to a universal mudguards for motor vehicles. More particularly, it relates to such a mudguards having a flexible flap and an adapter protrusion for clamping and aligning the mudguard with respect to the fender of the vehicle. Even more particularly, the invention relates to the mudguard supplied with special clamps, for easy attachment and improved alignment with the chassis or fender.

BACKGROUND OF THE INVENTION

The invention concerns a universal motor vehicle mudguard flap and clamp for attaching the flap to motor vehicles. The invention is particularly directed to mudguard flaps having a flap of flexible material which is provided with a main body flap and an adapter protrusion near the top thereof to align the flap with the contours of the vehicle chassis. The flap has an upper edge of the main body flap which is either curved or straight and joins with an inside edge of the adapter protrusion which, preferably, at least in the region of the inner edge of the adapter protrusion, is provided with a flat, bendable, sheet metal strip that serves as a reinforcement plate. More particularly, the invention is concerned with providing at least one fastening clamp for such mudguard flaps which engages the adapter protrusion and the chassis or fender of the vehicle.

In known mudguards of the present type, essentially one-piece, U-shaped clamps are used to connect the mudguards to the vehicle. Between the shanks of the U-shape, a mounting area is formed, i.e., between the base of the U-shape and the shanks thereof. The clamping effect is obtained by means of a bolt which is screwed through one shank and in the direction of the other shank so that between the end of the bolt and the other shank, the chassis or fender and the mudguard are connected. This type of fastening clamps results, in existing mudguards, in two fundamental disadvantages. On the one hand, it limits the opening of the mounting area, i.e., the area between the shanks and, on the other hand, it produces an unfavorable positioning of the bolt which causes the clamping effect.

The limitation placed on the opening of the mounting area, which is inherent in the one-piece U-shaped design, often results in the inability to mount the mudguard along the fender fold, e.g., the total thickness of the fender fold and the thickness of the mounting region of the flap exceeds that of the mounting opening of the clamp. This excessive thickness can stem from the presence of special fender reinforcements or from the addition of a layer of corrosion protection undercoating, sound proofing or similar matters.

It would be theoretically possible to design larger U-shaped clamps so that there is a sufficiently large mounting opening to accommodate even excessive thickness of the fender fold and flap, but, aside from the unaesthetic appearance, with modern shaped fender folds, larger clamps can result in clamp/tire contact. Since the bolt of the clamp must be brought into direct contact with the areas to be clamped, even the tightened bolt will protrude from the shank into which it is screwed. The degree of protrusion will depend, of course, on the total thickness of the areas to be clamped, as explained above. It will be appreciated that the bolt must be long enough to tighten against very thin thicknesses as well as larger thicknesses. The bolt will protrude in the direction of the adjacent tire and this can lead to a contact between the bolt and tire, especially in cases of vehicles with soft suspension. Thus, when the clamp is designed with a large opening, a longer bolt will be required and thus will give rise to an even greater danger of bolt/tire contact. This disadvantage can not be obviated by turning the clamp so as to bring the bolt behind the fender fold, since that would make the bolt almost inaccessible, assuming that there is any room at all behind the fender fold for the bolt.

Attempts have been made to avoid these difficulties by using fastening devices other than clamps. Typical of such devices is a bolt with a nut and two washers. The bolt passes through the adapter protrusion of the mudguard and continues through the main body of the flap and the bolt head rest against a washer that is placed on the flap. The bolt passes through the second washer, which grips behind the fender fold, and the nut, when screwed on the bolt, is pressed against the fender fold. The resulting clamping effect holds the mudguard flap against the fender fold. However, in the this arrangement bolt holes must be made in both the mudguard and the fender fold. Frequently, however, this assembly lacks sufficient rigidity, especially when the fender fold has additional layers of material or has been reinforced, since there is a pronounced tilting of the washer which engages the fender fold from behind, and this results in an inadequate clamping effect.

OBJECTS OF THE INVENTION

Accordingly, it is an object of the present invention to provide a universal mudguard and special fastening clamps which can be attached to different motor vehicles, but in a convenient and simple manner. It is a further object of the invention to provide such combination of mudguard and clamps that rigid clamping may be achieved even with reinforced fender folds and undercoated fender folds.

BRIEF DESCRIPTION OF THE INVENTION

Figure 1:
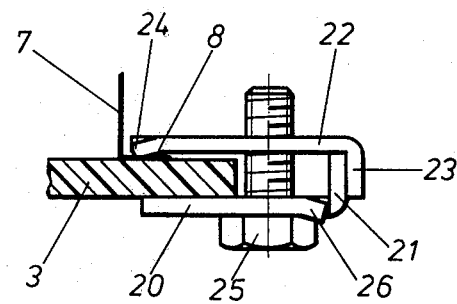
FIG. 1 is a partial view, and partly in section, of a mudguard attached to a fender fold according to the invention.

Briefly stated, the invention is an improvement in a combination of a universal mudguard flap for motor vehicles and at least one clamp for attaching the flap to the fender fold of a vehicle. Such universal mudguard flaps comprise a main body flap, an adapter protrusion at the top thereof to align the mudguard flap with the contours of the vehicle chassis, and an upper edge on the main body flap which joins an inner edge of the adapter protrusion. Clamps for attaching such universal mudguard flaps have an open end, which is engagable with the upper edge of the main body flap and an adjacent portion of the fender fold. These clamps have a closed end spaced from the open end, through which a tightening means passes, e.g., screw, bolt and the like.

The present improvement comprises a clamp having generally two parallel clamping jaws held together by at least one bolt. The closed end has a crosspiece projecting from one of the jaws and abutting the other jaw, and at least one jaw at the open end has at least one bent over corner end area wherein the direction of the bend it toward the other jaw. Preferably, the crosspiece is formed by bending the clamping jaw carrying the crosspiece. It is also preferred that the other jaw have a closed end area which is generally parallel to and abutts that crosspiece.

For purposes of allowing attachment of the mudguard flap with only one clamp, the length of the clamp is, preferably, at least twice the depth of the clamp from the open end to the bolt, and with such longer clamps, the clamping jaws may be joined by two bolts which are disposed at intervals in the direction of the length of the clamp.

The adapter protrusion of the mudguard flap may be provided with cuts which are disposed in the inner edge of adapter protrusion, the cuts having a width that is greater than the diameter of the bolts or bolts, and preferably the interval of adjacent cuts is equal to the interval of the two bolts, when two bolts are used. This allows for greater adjustment of the mudguard flap to the contour of the chassis of the vehicle.

Alternatively, the adapter protrusion may be provided with a slit which follows the pattern of the inner edge of the adapter protrusion, the width of the slit exceeding the diameter of the bolts and the distance from the inner edge of the slit being smaller than the distance of the bolts to the crosspiece. This allows the clamps to be preassembled on the mudguard flap and increases the ability to align the flap to the vehicle chassis. For even greater adjustment, in this regard, the slit may have lateral cuts therein whose widths exceed the diameter of the bolts and more preferably the interval between adjacent lateral cuts is equal to the intervals between the bolts. Even greater adjustment can be achieved when the adjacent lateral cuts are provided on opposing sides of the slit.

As an alternative to the foregoing, adjustment may be increased by the clamp configuration, where the clamping jaws are provided with a slotted hole or holes through which the bolt or bolts pass and each bolt is provided with a nut on the opposite side of the clamp.

For special fender folds, it is preferred that at least the clamping jaw carrying the crosspiece have on the closed end an edge area that is bent outwardly. This allows for clamping the mudguard to special fender fold configurations.

Also, to accommodate special fender fold configurations, the clamping jaw which is adjacent to the bolthead of the bolt has the clamping end thereof bent over in the direction of the other clamping jaw. The bending line of the bend is approximately parallel to the opening formed between the clamping jaws, and the other clamping jaw is similarly bent to maintain the generally parallel configuration of the jaws in the bent region. The bending line, ususally, is between the open end of the clamp and the bolt, and the bending lines on the two jaws are opposite each other. More preferably, in this arrangement, the section of the clamping jaw which is closer to the bolthead is longer between the bolt and the open end than the corresponding section of the other clamping jaw.

Further, to allow attaching the clamp to special fender folds, a sheet metal holder may rest between the clamping jaws and is penetrated by the bolt. The sheet metal holder extends over the opening of the clamping jaws and has a protruding end which is bent in the direction of the clamping jaw which is furtherest from the bolthead. The sheet metal holder may have a series of holes to accommodate the bolt, the series of holes being in the direction that is vertical to the open end.

To further insure good clamping, the area of the inner edge of the adapter protrusion, which during assembly comes into contact with the fender fold, may be provided with a number of projections for roughening the area, and thus insuring greater coefficiency of friction between the flap and the clamp, as well as the fender fold.

DETAILED DESCRIPTION OF THE INVENTION

As noted above, the invention has as its basis a combination of a special mudguard flap and clamp or clamps which, in combination, avoid the above discussed difficulties in mounting and aligning universal mudguards with conventional clamps. The invention can best be initially understood from the drawings. Thus, first, the drawings will be considered in detail.

Figure 4:
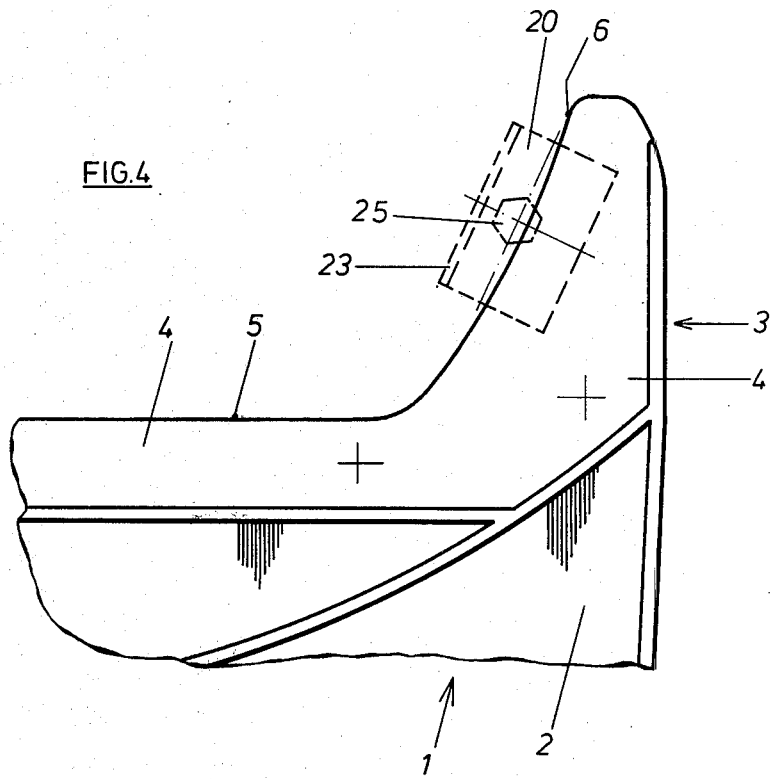
FIG. 4 is a view of the clamp attached to a mudguard, shown partially.

The mudguard that is partially shown in FIG. 1, is attached to fender fold 8 of a chassis 7. The adapter protrusion 3 of a mudguard flap, for example the mudguard flap 1 of FIG. 4, is placed on fender fold 8. The clamping area that is thus formed between the clamping jaws 20 and 22 of the fastening clamp reaches over the fold and the edge area of the adapter protrusion 3 so that the inner edge 6 rests near the bolt 25 or touches the same. (In the illustration of FIG. 1, the bendable sheet metal strip 4 shown in FIG. 4 is not shown.)

Figure 2:
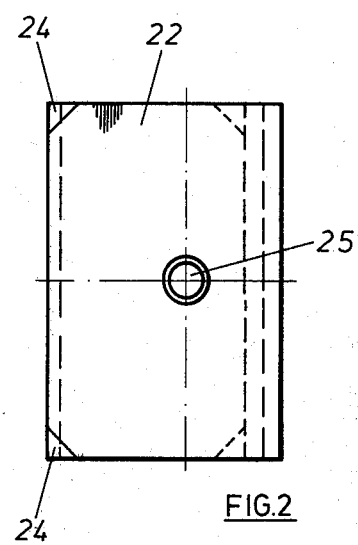
FIG. 2 is a top view of the fastening clamp for the mudguard shown in FIG. 1.

The fastening clamp shown in FIGS. 1 and 2 consists of two clamping jaws 20 and 22, for example, of galvanized steel. In clamping jaw 20 a bolt 25 extends into a threaded hole in the clamping jaw 22. The end area 24 of the claming jaw 22 which rests inside the mounting region is lightly bent in the direction of the jaw 20 so that bent over corner end areas 24 are formed and rest on the fender fold 8.

The clamping jaw 20 is provided on the end facing away from the mounting area with a crosspiece 21, which is conveniently formed by bending. This crosspiece rests against the lower surface of the clamping jaw 22. The height of the crosspiece corresponds, with consideration for the bent over end areas 24, approximately to the thickness of the inner edge 6 of the adapter protrusion 3 and the fender fold 8, so that as result of this crosspiece 21, the clamping jaws 20 and 22, in the tightened condition, are kept largely parallel to one another, thus, obviating any danger of slipping off. Twisting of the clamping jaws with respect to each other during assembly, and in an assembled state, is prevented by bringing the bent over closed end area 23 of the clamping jaw 22 in contact with the crosspiece 21.

FIG. 1 shows the mounting of a mudguard which corresponds, more or less, to the mudguard in FIG. 4. That is, mudguard flap 1 has a main body flap 2, an adjoining adapter protrusion 3, and a sheet metal strip 4, which serves as a reinforcement piece. This reinforcement follows the inner edge 6 of the adapter protrusion 3 and the upper edge 5 of the main body flap 2.

The mounting of this mudguard flap onto the fender fold may be accomplished, in the manner indicated by FIG. 4, but by means of one or two fastening clamps of the type shown in FIGS. 1 and 2. The fastening clamps are applied at places which correspond to the pattern of the fender fold found in a particular motor vehicle.

The dimensions of the clamp shown in FIGS. 1 and 2 may vary. Thus, the recess depth (the depth up to which the mudguard flap can be slid into the mounting area until it hits against bolt 25), may vary considerably and may be larger than the length of the clamp, which is the extension in the vertical in FIG. 2. As illustrated in FIG. 2, the length of the clamp may be considerably longer than the recess depth of the clamp. In fact, the length may be about 3 times that of the recess depth or more. In this manner a relatively larger distance is obtained between the bent over corner end areas 24, which come in direct pressed contact along fender fold 8. As a result, as shown in FIG. 4, a single clamp suffices for the mounting of the mudguard along the fender fold. This clamp envelops with its mounting region, the fender fold, a region containing the inner edge 6 of adapter protrusion 3 plus, if desired, a region of the bendable sheet metal strip 4, which runs along the inner edge 6 of the adapter protrusion 3 and the upper edge 5 of main body flap 2 of the mudguard flap 1. The fastening clamp can be slid along the inner edge 6 of the adapter protrusion 3 in order to obtain the best possible position for mounting the mudguard along a fender fold.

FIGS. 1 and 2 also show edge areas 26 of clamping jaw 20 (bent outwardly at the closed end). These areas rest in the transition region of crosspiece 21 and the function of these areas will be explained hereinafter.

Figure 3:
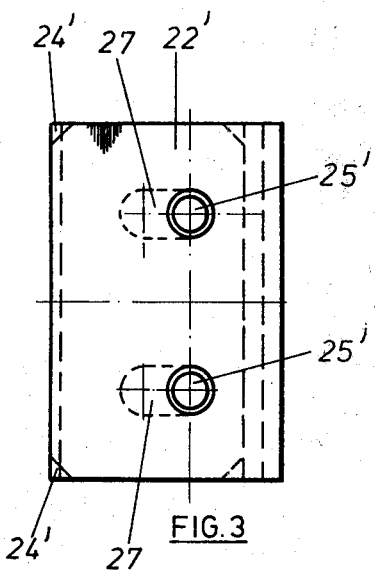
FIG. 3 is a top view similar to FIG. 1, but showing optional features.

FIG. 3 shows a fastening clamp that has a design similar as the clamp depicted in FIGS. 1 and 2. It differs from the clamp shown in FIGS. 1 and 2 only to the extent that instead of the one bolt 25, two bolts 25' are provided which are at an interval from each other in a longitudinal (length) direction. This permits using clamping jaws with lesser strength and the bolts, too, can have a lesser strength and/or smaller diameters than those used in the clamping jaws of FIGS. 1 and 2.

It should also be noted, that as a result of the flat alignment of the clamping jaw 20 (no bent over end areas 24), a lesser material strength can be used for this clamping jaw than is used for the clamping jaw 22. The reason for this is that the clamping jaw 20 is under less load than the clamping jaw 22 because of this flat alignment.

Figure 5:
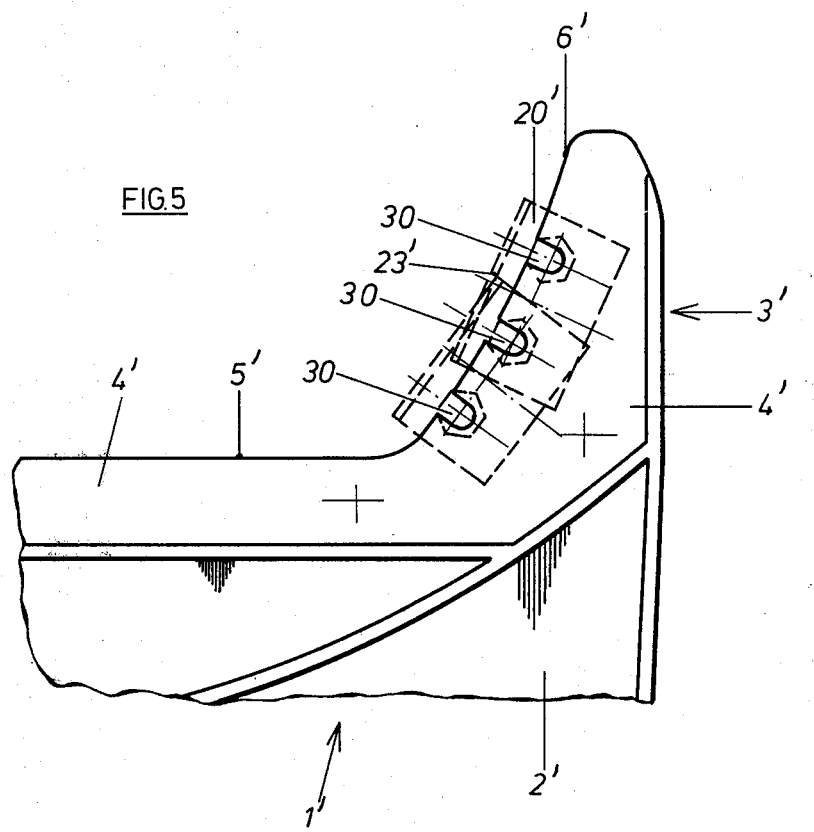
FIG. 5 shows a mudguard similar to the one in FIG. 4 but with cuts extending from the inner edge for receiving the clamps.

As shown in FIG. 5, the clamp of FIG. 3 is advantageously used with a special mudguard flap. Thus, mounting the mudguard flap 1' may be achieved in that the adapter protrusion 3' is provided with cuts 30 which run from the inner edge 6' of the adapter protrusion. These will also extend into the sheet metal strip 4' and have a width which is larger than the bolt's diameter. This permits greater flexibility in aligning the fastening clamp with a single bolt or permits aligning and fastening clamps having two bolts in a way that the two bolts 25' (see FIG. 3) rest against the inner edge 6' of the adapter protrusion 3' or, even, that one of the bolts will have a certain distance from this inner edge 6'. On the other hand, further tilting of the fastening clamp may be achieved by introducing at least one of the bolts 25' in a slit, rather than a cut out (not shown). This increased angle adjustment of the fastening clamp permits an alignment of the enveloping mounting area of the clamp on the fender folds with the most diverse patterns. In an extreme case, it will be possible to adjust the fastening clamp of the mudguard pursuant to FIG. 5 between a vertical alignment of the connecting lines of the two bolts and an alignment of about 65° in respect to the vertical.

Figure 6:
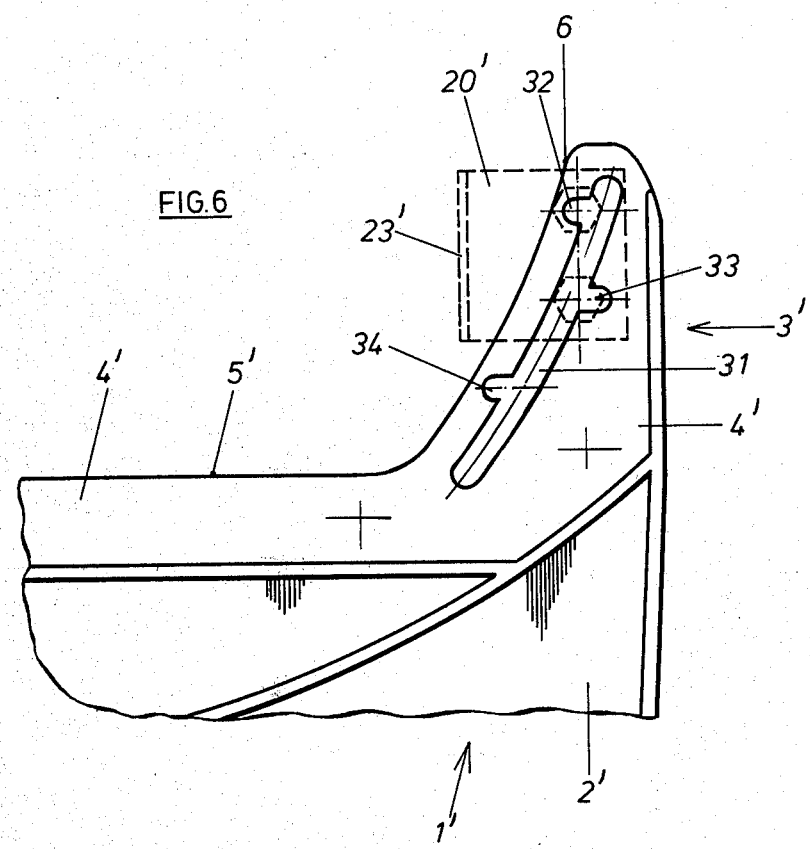
FIG. 6 shows a mudguard flap similar to FIG. 5 but with a slit and cuts therein to receive the bolts of a fastening clamp.

For even more adjustment, as shown in FIG. 6, a slit 31 has been provided which runs about parallel to the inner edge 6' of the adapter protrusion 3'. The width of the slit is wider than the diameter of the bolts 25'. From this slit extends, in the direction of the inner edge 6', lateral cuts 32 and 34. In the direction away from the inner edge 6' is the lateral cut 33 whose width is again larger than the diameter of the bolts 25'.

It should be noted that in this example the distance between the bolts 25' and the crosspiece that corresponds to the crosspiece 21 in FIG. 1 is larger than in the clamps shown in FIGS. 1 and 2. The reason for this is to assure that the supporting regions for every assembly will fall outside of the adapter protrusion 3'.

The bolts of the fastening clamp which otherwise are shaped as in the fastening clamp depicted in FIG. 3, pass through the slit 31 so that on each side of the adapter protrusion 3' is one clamping jaw. When the bolts are loose, the fastening clamp can be moved along the slit 31. Since the distance of adjoining lateral cuts 32, 33 and 33, 34 are equal to the distance between the bolts, the bolts can be moved inside these lateral slits. This sliding movement allows a corresponding swivelling of the fastening clamps at a place suitable for juncture with the fender fold. This means that the fastening clamp will be aligned pursuant to the pattern of the fender fold.

In this connection it should be noted that a larger angular adjustment of the fastening clamp can be obtained by means other than the above-discribed slits and cutouts in the adapter edge of the mudguard flap. It can also be achieved by arranging the bolts in longitudinal slots in the clamp jaws. Such longitudinal slots are indicated by dashed lines 27 in FIG. 3. The bolts 25' must, of course, then have a nut which rests on the clamp jaw 22' (not shown in the Figure), so as to make possible sliding of the bolts 25' over the entire length of the longitudinal holes 27.

The fastening clamps, according to this invention, make possible the attachment of the mudguard flap along chassis or fenders which did not, in the past, allow the use of U-shaped clamps or where the use of these types of clamps was only possible with great difficulty.

Figure 7:
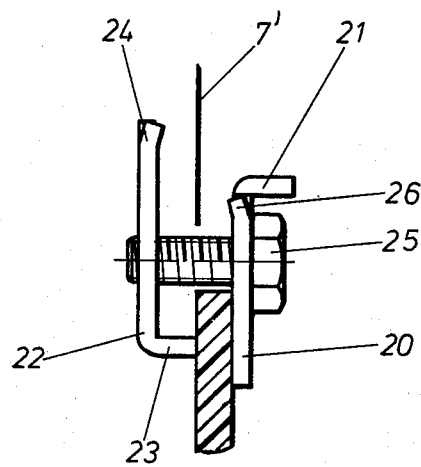
FIG. 7 shows a means for mounting the mudguard to a chassis curvature that runs parallel to the mudguard flap.

Thus, for example, FIG. 7 indicates the attachment of the mudguard flap along a chassis-region 7' where no fender fold is available, as in the case, for example, in the Renault R5. This fender-region 7' rests farther inside this vehicle than does the actual fender edge so that the fastening clamps must be applied to the upper edge of the flap's main body. The manner of attachment is such that the end area 23 of the clamp jaw 24 rests against the flap's main body while the clamp jaw 20 is turned by 180°, so that the crosspiece 21 has no function, while the level region of the clamp jaw 20 also rests against the flap's main body or, if used, against the sheet metal strip. If the bolt 25 is tightened in this position, then the bent over corner end areas 24 and the bent out edge area 26 will be pressed against the chassis-region 7' and a reliable attachment of the mudguard will be achieved.

Figure 8:
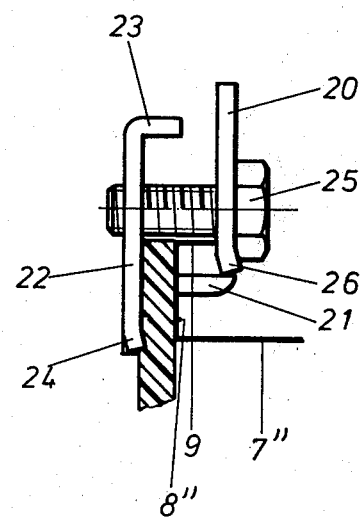
FIG. 8 shows the mounting of the mudguard to a so-called 180° fold.

FIG. 8 depicts the use of the present fastening clamp for attaching a mudguard flap along a so-called 180° fold. That is, a fender fold which does not only have the common fold 8″ which adjoins the fender 7″ but, additionally, a fold section 9 which is led back from the fold 8‴.

In this type of assembly the clamp jaw 22 retains its original position but comes to rest on the surface of the mudguard flap (or the sheet metal strip) that faces the wheel. The clamp jaw 20 with its crosspiece 21 engages from behind the fold section 9 whereby either the crosspiece 21 comes to rest along the fold 8″ or the clamping jaw 20 becomes pressed against the free edge of the fold section 9.

Figure 9:
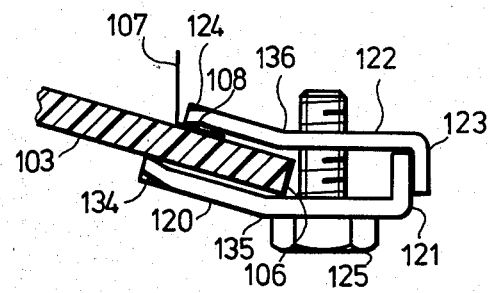
FIG. 9 shows a side view, partially in section, of a further feature of the clamp of FIG. 1.
Figure 10:
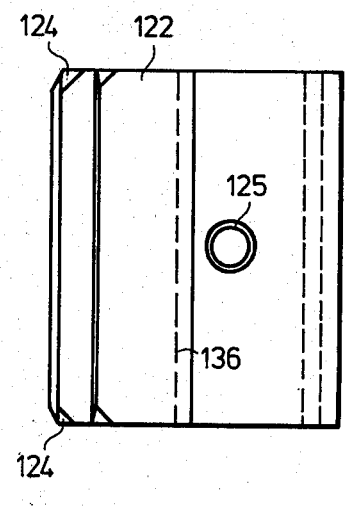
FIG. 10 shows a top view of the fastening clamp of FIG. 9.

The fastening clamp shown in FIGS. 9 and 10 corresponds, generally, to the fastening clamp in FIGS. 1 and 2. Thus, two clamping jaws 120 and 122 are held together by a bolt 125 which turns into a threaded hole in clamping jaw 122 and whose bolthead rests against the clamping jaw 120. The clamping jaw 120 has a crosspiece 121 which is formed by bending. In an assembled state, this crosspiece supports the clamping jaw 122 so that during clamping, that is, when the edge area of the adapter protrusion 103 and the fender fold 108 are gripped by means of the free ends (or clamping ends) of the clamping jaws which is formed in the opening area, then the clamping jaws 120, 122 will have a largely parallel position. The end area 123 of the clamping jaw 122 which is formed by bending, will prevent a twisting of the clamping jaws in respect to each other. Furthermore, as shown, all corner end areas 124 and 134 of the clamping jaws of the fastening clamp illustrated in FIGS. 9 and 10 are in each case, bent in the direction of the other clamping jaw. The major differences in respect to the clamping jaw illustrated in FIGS. 1 and 2, are as follows. In the clamping jaw 120 of FIGS. 9 and 10 the area between the free end of the bolt 125 is bend around the bending line 135 which runs parallel to the opening; that is the area between the free ends of the clamping jaws 120 and 122. It is bend towards the clamping jaw 122 while the corresponding section of the clamping jaw 122 is bend around the bending line 136 in the same direction and by the same angle. The angle of the bend amounts to perferably 10° to 20° and still more preferred, 14° to 18° and especially 16°. This corresponds to the angle between fold and fender most commonly in use today.

In addition, the clamping jaw 120, that is the clamping jaw which in an assembled state is closest to the motor vehicle's wheel, and closest to the bolthead of the bolt, is extended in respect to the clamping jaw 122. Thus, the section that rests between the free end and the bolt will be longer than the corresponding section of clamping jaw 122.

When a mudguard is attached to a fender fold 108 by means of this type of clamping jaw which then, as result of the position of the fender fold, as shown, becomes titled towards the rotation axis of the motor vehicle, the free edge of the motor vehicle's wheel will be closer to the junction or mounting point along the chassis 107. Then, the part of the fastening clamp that runs between the bending lines 135 and 136 and the crosspiece 123 will not represent a continuation of the fender fold 108 inclination or tilt. That is, it will not approach closer to the motor vehicle's wheel but rather, depending on the tilt of the fender fold and the magnitude of the bend, it will extend away from this wheel, or be parallel to it, or, at least, to a smaller extent towards the motor vehicle's wheel than would be the case if there were no bend. This means that the danger of contact between bolt 125 and the motor vehicle's wheel has been considerably reduced.

Additionally, this extended section of clamping jaw 120 assures that during assembly and tightening of bolt 125, the rotation moment resulting from clamping on the opposing free ends of the clamping jaw is turned into a swivel or rocking motion of the fastening clamp. A rocking motion causes the end of the fastening clamp which carries the crosspiece 121 to be moved further away from the wheel and thus reinforce the effect of the bending along the bending lines 135 and 136.

Figure 11:
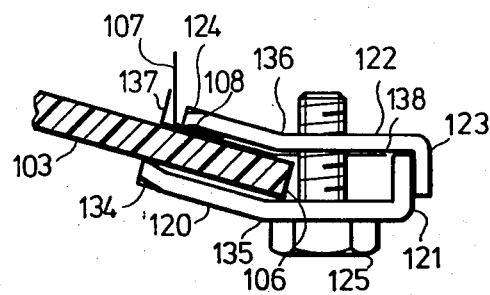
FIG. 11 shows a clamp similar to the one shown in FIG. 9 but equipped with a sheet metal holder for the fastening clamp.
Figure 12:
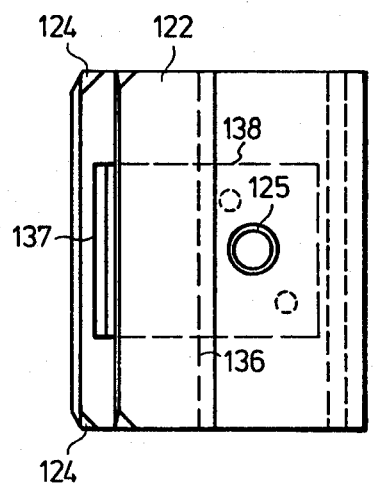
FIG. 12 shows a top view of the fastening clamp of FIG. 11.

The fastening clamp illustrated in FIGS. 11 and 12 corresponds largely to the fastening clamp illustrated in FIGS. 9 and 10 whereby the same parts have been given the same designations and they need therefore not be described anew.

In addition to the fastening clamp illustrated in FIGS. 9 and 10, the fastening clamp in FIGS. 11 and 12 is provided with a sheet metal holder (137-138) which in an assembled state of the mudguard rests between the clamping jaw 120 and 122, on the one hand, and between the fender fold 108 and the adapter protrusion 103 of the mudguard flap, on the other hand. This sheet metal holder has a bent section 137 which, together with the remaining part of 137, forms an acute angle of about 75° to 85°.

As can be seen in FIG. 11, the bent section 137 rests against the chassis 107 while the bolt 125 passes through a drilled hole in section 138 of the metal holder. By means of this arrangement it is assured that the fastening clamp in an assembled state can not be pulled off the fender fold 108. Rather, the acute angle between sections 137 and 138, will assure that, during assembly, the spring effect of section 137 whose free end rests against the chassis 107 will cause the fastening clamp to be pulled up along the fender fold 108 and will be securely held there.

In order to be able to align with, or along different dimensions of, the fender folds 108, the metal holder is provided in the area 137, as shown in FIG. 12, with several drill holes which are in a direction that is perpendicular to the opening of the clamp and at a distance from each other. Through these holes the bolt 125 can be selectively inserted. This makes it possible to change the interval of the section 138 of the metal holder from the free end of the clamping jaw 122 and to adapt it to the diverse dimensions of the fender fold 108.

The metal holder consists, preferably, of a corrosion resistant cold-rolled steel which might have, for example, a thickness of 0.5 mm.

It should be pointed out that the previously described example of the fastening clamps can, of course, also be provided with the features shown in FIG. 3. Also, as explained above, the clamps may have lengths which are considerably greater than the recess depth. Consequently, when these type of clamps are used, a reliable and secure mounting of the mudguard flap can be achieved with one or two fastening clamps.

Figure 13:
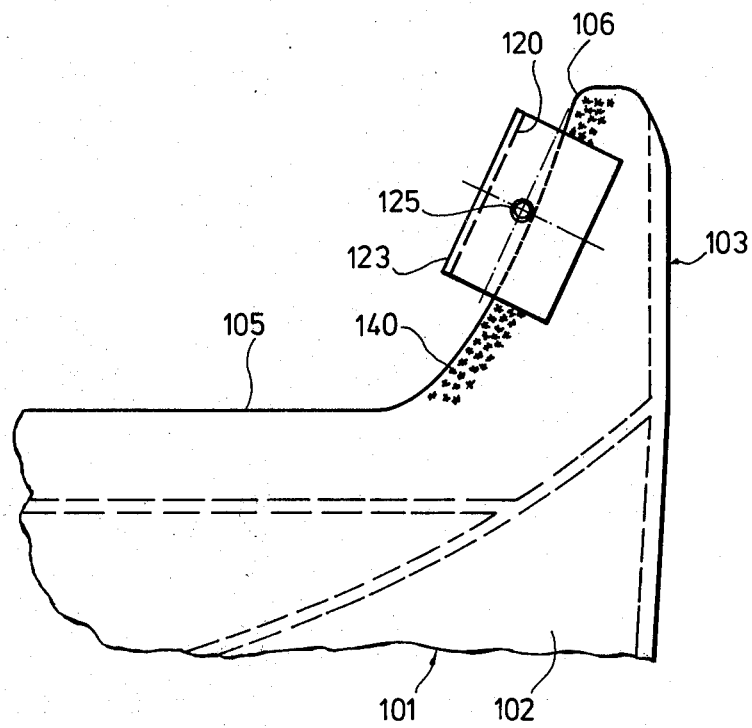
FIG. 13 shows a partial view of a mudguard flap with a fastening clamp wherein the mudguard has a roughened edge area.

In FIG. 13, a part of the mudguard flap 101 is shown in schematic together with a fastening clamp attached to the adapter protrusion 103. The fastening clamp is such as the ones illustrated in FIGS. 1 and 9. It engages the inner edge 106 of the adapter protrusion 103. In this illustration, the backside of the mudguard flap 1 is shown, i.e., the side which faces away from the motor vehicle's wheel. The ribs on the side of the flap facing the wheel are indicated by dash lines. The surface facing the wheel of the motor vehicle is preferably provided with a bendable reinforcement sheet in the manner described above.

During the assembly of the mudguard illustrated in FIG. 13, the edge area of the adapter protrusion is aligned (brought into contact) with the fender fold. The schematically illustrated protrusions 140, which serve as roughenings and which can be formed in a suitable way during the manufacture of the mudguard flap, will increase the coefficient of friction between the adapter protrusion and fender fold so that the assembled mudguard flap is more securely held in its position.

As can be appreciated from the foregoing, the mudguard is inserted into the side of the clamp facing away from the crosspiece, i.e., the open end of the clamp. The open end of the clamp, with the mudguard therein is then placed on the chassis or fender or on a part of the fender. Since the jaws are pivotable about the crosspiece, the opened end of the jaws will span the mudguard, and any undercoating or reinforcement on the folds of the fender. Preferably, in a tightened condition, the two jaws will be in a somewhat parallel configuration which will result in a maximum clamping force being exerted on the mudguard, fender fold, etc. This insures that the clamp will not slip off the parts being connected. Accordingly, it is further preferred that the distance between the clamping jaws, and consequently the dimension of the crosspiece, be chosen so as to approximately correspond to the thickness of all the parts that are to be held within the jaws, which will result in the approximate parallel configuration of the jaws of the tightened clamp.

Furthermore, since the bolt will not be engaged, clamping wise, with the parts to be connected, but merely joins the two clamping jaws, which in turn grip the parts that need to be mounted, the head of the bolt will, in a tightened condition, rest on the outside surface of one clamping jaw. Thus, the bolt will not protrude beyond the outside surface of the jaw and, thus, will not contact the tires, even on motor vehicles with very soft suspension.

To further assure that the two clamping jaws will not twist with respect to each other when assembled or while clamping, the clamping jaw which is contacted by the crosspiece at the closed end of the clamp, can be provided an end area which runs generally parallel to the crosspiece and abuts the crosspiece. This end area can be formed, for example, by bending over the clamping jaw's end. By means of this flat setting of the crosspiece and end area, a reliable positioning of the two clamping jaws is obtained.

The clamping reliability is increased when at least one clamping jaw, but preferably both clamping jaws, is provided with the bent over corner end areas 24. These corner areas are pressed against the surface of the parts that are to be connected by the application of the clamping force of the bolt. When the areas are small they exert a very high pressure.

Conventionally, two fastening clamps are used to mount a mudguard. These are arranged at a relatively long distance from another, in order to assure a reliable connection between the mudguard and fender fold and also to secure the mudguard against rotation thereof. Surprisingly, it has been found that it suffices to use only one single fastening clamp of the type of the invention to connect the mudguard to the fender, if the length of this fastening clamp is twice, preferably 2.5 to 3 times, the recess depth of the mounting area formed by the open jaws. The term "recess depth" refers to the distance between the end of open jaws forming the mouting area and the surface line of the bolt which faces the open end.

In order to assure the best possible application of the clamping force, when a single fastening clamp is used, and without providing the clamping jaw with excessive strength and rigidity, the two clamping jaws may have two bolts, as described above. These bolts, which are placed at a distance from each other in the longitudinal direction of the fastening clamp, will provide the requisite clamping force.

The adaptability of the present universal mudguard to accommodate different fender curvatures is improved by providing the cuts or grooves in the adapter protrusion or, when present, in sheet metal strips which are attached thereto. If one single fastening clamp with two bolts is used, then the interval between adjacent cuts or grooves is equal to the distance between the bolts.

These cuts make possible the displacement of the bolts for the fastening clamps and thus the displacement of the entire fastening clamp and its mounting region further into the adapter protrusion of the mudguard flap. Thus, the mudguard can be mounted even when the fender fold's shape diverges considerably from the pattern of the inner edge of the adapter protrusion. However, in that case the support of the clamping jaws remains outside of the adapter protrusion. Especially, in those cases when a fastening clamp with two bolts is used, the cuts will make possible an extensive angle adjustment of the fastening clamp and a resulting satisfactory accommodation to the shape of the fender fold.

The fastening clamp or fastening clamps need not be slipped from outside over parts that require connection. Thus, the above-described slit in the adapter protrusion and its width will be larger than the diameter of the bolt, or bolts and the interval from the inner edge will be smaller than the distance between the bolt, or bolts and the crosspiece.

Into this slit the required fastening clamp or fastening clamps can be placed by the manufacturer. Thus, the clamping jaws will rest on both sides of the adapter protrusion and the bolt, or bolts, will join the clamping jaws and pass through the slit. The clamping jaw or jaws can be adjusted along the slit so that their position can abe aligned with the fender fold of the respective motor vehicle.

The adaptibility to different fold patterns can be further provided by the cuts which radiate sideways from the slit. Their width will be larger than the diameter of the bolt or bolts and if one single fastening clamp is used with two bolts then the interval between adjoining cuts will be equal to the distance between the bolts. Preferably, in this case, adjoining cuts are provided on opposing sides of the slit.

The adjustability or alignment to different fold patterns is also improved by providing the clamping jaws with the longitudinal holes (FIG. 3) to receive one or more bolts with nuts. This means that the accommodation depth of the mounting region can be continuously adjusted between a maximum and minimum value. The nut, preferably, engages with a protrusion, or something similar, adjoining the longitudinal slot so that it is held against a twisting motion, while in the more general case the bolt is generally screwed into a threaded hole of the clamping jaw (FIG. 1). The clamping jaw adjoining the bolthead is provided with a hole that has a diameter larger than that of the bolt.

In some cases it is desirable to place the fastening clamp or fastening clamps with the bolthead facing the vehicle tire still further away from the tire. This is especially true when the fender fold is not exactly parallel with the wheel axis but rather has a free edge that is closer to the tire and tilted towards this axis. If fastening clamps of the type shown in FIG. 1 are used in this situation, they will, in an assembled state, extend with the same angle as the fender fold relative to the rotation axis of the wheel. That is, they will tilt towards the wheel. In this case, the clamping jaws have their clamping jaw, as shown in FIG. 9. Preferably the clamping jaw which is furthest from the bolthead is bent in the same direction as the other clamping jaw.

By constructing the clamping jaw or clamping jaws in this fashion one guarantees that the region of the clamping jaw which rests on the side of the bending line or bending area which faces away from opening will not extend in the direction of the tilted fender fold. Instead, depending on the size of the angle of the bend, it will be tilted to a lesser extent towards the motor vehicle's wheel or, will be parallel to the wheel or even, tilted away from the wheel. Thus, even in the case of a tilted fender fold there will be no danger that the fastening clamp or clamps and/or the corresponding boltheads will come in contact with the vehicle's tires.

The advantageous effect of the bending is also obtained when the bending line or bending area is between the opening and the bolt and as close as possible to the bolt. The reason for this is that generally the fastening clamp is pushed up to the stop at the fold and the bolt along the fold so that the entire part of the fastening clamp that does not grip over the fender fold is bent away. At least it will not extend towards the vehicle's wheel with the same tilt as the part of the fastening clamp that engages the tilted fender fold. In this connection, it should be noted, however, that the bend line or bend area can also be located on the other side of the bolt; in which case, however, the overall effect of the bending will be somewhat less. The bend lines or bend areas of the two clamping jaws rest, preferably, opposite each other at the same height. The clamping jaw can be bent over by the same angle.

The tilt of the fastening clamp away from the motor vehicle's wheel can be increased still further by having the section between the bolt and the clamp opening, i.e., the section which is closer to the bolthead and, in an assembled state, the clamping jaw facing the motor vehicle, is larger than the corresponding section of the other clamping jaw. This means, especially when the edge areas of the two clamping jaws are bent in the direction of the other clamping jaw, that when the clamp presses together the fender fold and the flap, a pivot effect may be obtained. This pivot effect causes the end of the fastening clamp which has the crosspiece to be moved away from the motor vehicle's wheel.

In the case of motor vehicles with very small fender folds or, in the case of cars in which the space behind the fender fold, at least in part, is covered with a layer of sound proofing material, it can be difficult to use the fastening clamps in a way that assures a reliable hold on the mudguard. Indeed, it can even happen that the fastening clamp, as result of the turning moments applied to the bolt during assembly, can open or loosen from the fender fold. That is, a tightening of the clamp is hardly possible.

In order to avoid this difficulty, the invention provides the sheet metal holder which rests between the two clamping jaws through which the bolt passes. This sheet metal holder extends across the opening of the clamping jaws and is bent over at its protruding end in the direction of the clamping jaw furtherest from the bolthead. In this case, the section of the holding metal holder that rests between the clamping jaws and its bent over section will, preferably, enclose an acute angle. This metal holder is aligned with the fender fold during assembly, so that its bent section will align outside the chassis section which adjoins the fender fold when the bolt holding the two clamping jaws together is tightened. This prevents a twisting or turning-off of the fastener clamp. Furthermore, the section aligned with the chassis area assures that the clamping jaw furtherest from the bolthead is raised up along the fender fold when the bolt is tightened. This is, among other things, of importance when the rearside of the fold is covered with sound-proofing material.

The angle of the bend is generally matched to the angle between the fender fold and the adjoining chassis area. That means it can be an obtuse angle or even an angle of 90°. If the angle between the section of the metal holder resting between the clamping jaws and its bend section, however, is acute then a tension force is generated which augments the clamping action of the fastening clamp along the fender fold or the motion onto this fold.

In order to achieve a matchup to most diverse fold shapes and fender curvatures, the sheet metal holder can be provided with a series of holes space from each other in the direction that is perpendicular to the opening. Through these holes pass the bolt or bolts, so that the interval of the bent section in respect to the free ends of the clamping jaws which are in the opening range, can be adjusted.

The effect of the metal holder is not only obtained when the clamping jaws are bent in the manner described above but when the section between the bolt and the opening of the clamping jaw which is closer to the bolthead is longer than the corresponding section of the other clamping jaw.

In order to avoid a swivelling of the flap, the edge area adjacent to the inner edge of the adapter protrusion, which comes in contact with the fender fold, is provided on the surface with roughened projections. This increases the coefficient of friction between adapter edge and fender fold. The effect of these roughened projections will, of course, also be present with mounting devices other than those described above are used.

Thus, it can be seen that the objects are achieved and the invention extends to the spirit and scope of the following claims.

What is claimed is:

1. In a combination of a universal mudguard flap for motor vehicles and at least one clamp for attaching the flap to the fender fold of the vehicle, wherein the mudguard flap comprises a main body flap, an adapter protrusion at the top thereof to align the mudguard flap with the contours of the vehicle chassis, and an upper edge on the main body flap which joins with an inner edge of the adapter protrusion, and wherein the clamp has an open end, which is engagable with the said upper edge of the main body flap and an adjacent portion of the fender fold, and a closed end spaced from the open end, the improvement comprising a clamp having generally two parallel clamping jaws held together by at least one bolt, the closed end having a first crosspiece projecting generally perpendicularly from the end of one of the jaws and abutting the end of the other jaw and a second crosspiece projecting generally perpendicularly from the end of the other jaw and disposed in a contacting and generally overlapping parallel relationship with the said first crosspiece, and at least one jaw at the open end having at least one bent over corner end area wherein the direction of the bend is toward the other jaw.

2. The combination of claim 1 wherein the crosspiece is formed by bending the clamp jaw carrying the crosspiece.

3. The combination of claims 2 or 3 wherein the other jaw has a closed end area which is generally parallel to and abuts the said crosspiece.

4. The combination of claim 1 wherein the length of the clamp is at least twice the depth of the clamp from the open end to the bolt.

5. The combination of claim 4 wherein the clamping jaws are joined by two bolts which are disposed at intervals in the direction of the length of the clamp.

6. The combination of claim 1 or 5 wherein the adapter protrusion is provided with cuts which are disposed in the inner edge of the adapter protrusion, the cuts having a width that is greater than the diameter of the bolt or bolts.

7. The combination of claim 6 wherein the interval of adjacent cuts is equal to the interval of the two bolts.

8. The combination of claim 5 wherein the adapter protrusion is provided with a slit which follows the pattern of the inner edge of the adapter protrusion, the width of the slit exceeding the diameter of the bolts and the distance from the inner edge to the slit being smaller than the distance from the bolts to the crosspiece.

9. The combination of claim 8 wherein the slit has lateral cuts therein whose widths exceed the diameter of the bolts.

10. The combination of claim 9 wherein the interval between adjacent, lateral cuts is equal to the interval between the bolts.

11. The combination of claim 10 wherein the adjacent, lateral cuts are provided on opposing slides of the slit.

12. The combination of claim 1 or 5 wherein the clamping jaws are provided with a slotted hole or holes through which the bolt or bolts pass and each bolt is provided with a nut on the opposite side of the clamp.

13. The combination of claim 1 wherein at least the clamping jaw carrying the crosspiece has on the closed end an edge area that is bent outwardly.

14. The combination of claim 1 wherein the clamping jaw which is adjacent to the bolthead of the bolt has the clamping end thereof bent over in the direction of the other clamping jaw, the bending line being approximately parallel to the opening formed between the clamping jaws, and the other clamping jaw being similarly bent to maintain the generally parallel configuration of the jaws in the bent region.

15. The combination of claim 14 wherein the bending line is between the open end of the clamp and the bolt.

16. The combination of claim 14 wherein the bending lines of the two jaws are opposite each other.

17. The combination of claim 14 or 16 wherein the section of clamping jaw which is closer to the bolthead is longer between the bolt and the open end than the corresponding section of the other clamping jaw.

18. The combination of claim 14 wherein sheet metal holder rests between the clamping jaws and is penetrated by the bolt, said sheet metal holder extending over the opening of the clamping jaws and having a protruding end which is bent in the direction of the clamping jaw which is furtherest from the bolt-head.

19. The combination of claim 18 wherein the sheet metal holder has a series of holes to accommodate the bolt, said series of holes being in the direction that is vertical to the open end.

20. The combination of claim 1 or 14 wherein the area of the inner edge of the adapter protrusion, which during assembly comes in contact with the fender fold, is provided with a number of projections for roughening the area.

* * * * *